US006420460B1

(12) United States Patent
Zhang et al.

(10) Patent No.: US 6,420,460 B1
(45) Date of Patent: Jul. 16, 2002

(54) CATIONICALLY CURABLE COMPOSITIONS CONTAINING TRIARYLCYCLOPROPENYLIUM SALTS

(75) Inventors: Wenqin Zhang, Tranjin University (CN); John H. Malpert, Maumee; Douglas C. Neckers, Perrysburg, both of OH (US); Dustin B. Martin, Monroe, MI (US)

(73) Assignee: UCB S.A. (BE)

( * ) Notice: Subject to any disclaimer, the term of this patent is extended or adjusted under 35 U.S.C. 154(b) by 0 days.

(21) Appl. No.: 09/781,574

(22) Filed: Feb. 12, 2001

(51) Int. Cl.$^7$ .............................. C08K 5/05; C08L 63/02
(52) U.S. Cl. ...................... 523/453; 523/454; 523/455; 523/456; 528/88; 528/89; 528/90; 528/91; 528/408; 528/418
(58) Field of Search ................................. 523/453, 454, 523/455, 456; 528/88, 89, 90, 91, 408, 418, 421

(56) References Cited

U.S. PATENT DOCUMENTS

| 3,552,958 A | | 1/1971 | Seus et al. |
| 3,728,388 A | | 4/1973 | Schulenberg |
| 4,565,837 A | * | 1/1986 | Drain .................. 523/400 |
| 5,726,216 A | | 3/1998 | Janke et al. |
| 5,730,764 A | | 3/1998 | Williamson et al. |

FOREIGN PATENT DOCUMENTS

FR  2.013.105  3/1970

OTHER PUBLICATIONS

Komatsu, K. et al., "Synthesis of Mono–, Bis–, and Tris (diisopropylamino)triphenycyclopropenium Ions. Cyclopropenyl Analogues of Triphenylmethane Dyes,"*Journal of the American Chemical Society,* 99:19, pp. 6286–6290 (Sep. 14, 1977).

Frisch, P. et al., "An Unusual Oxidative Addition–Ligand Elimination Reaction. Preparation and Structure of $RhCl_2(PMe_2Ph)_2(C_3Ph_3)$,"*Journal of Organometallic chemistry,* 142, C61–C64 (1977).

Gompper et al., "σ–(Dicarbonyl–cyclopentadienyl–eisen) – Derivate von Cyclopropenen und Cyclopropenyliumsalzen", *Angew. Chem,* 90, Nr. 6, pp. 490–491 (1978).

Hughes, R. et al., "Reinvestigations of Some Reactions of Metal Carbonyl Anions with Cyclopropenium Cations. Conversion of $\eta^3$ –oxocyclobutenyl Ligands,"*Organometallics,* vol. 1, No. 10, pp. 1403–1405 (1982).

Van Tamelen et al., "Photolysis of triphenylcarbonium, Tropylium, and Triphenylcyclopropenium Ions", *Journal of American Chemistry Society,* vol. 90, No. 5, pp. 1372–1374 (Feb. 28, 1968).

D'yakonov, *Chemistry Abstracts,* vol. 72, No. 110857, p. 342 (1970).

Broser et al., "Substituierte Ttriphenyl–Cyclopropenylium–Kationen (2. Nitteilung),"*Tetrahedron Letters,* vol. 7, No. 51, pp. 5331–5332 (1968).

Baker, W., *Chemical Abstracts,* vol. 70, No. 87088b, p. 262 (1969).

Li et al., "A Novel Initiation System for the Cationic Polymerization of Glycidyl Phenyl Ether: Tetrakis(pentafluoropheny) gallate/cyclohexanone", *Nacromolecules,* vol. 34, pp. 2019–2021 (Jan. 24, 2001).

* cited by examiner

*Primary Examiner*—Robert Dawson
*Assistant Examiner*—D. Aylward
(74) *Attorney, Agent, or Firm*—Thompson Hine LLP

(57) ABSTRACT

The present invention relates to a thermally and cationically curable composition containing triarylcyclopropenylium salts and a solvent that is a Lewis base which contains acidic hydrogen and their use as thermal initiators in polymerization processes. The present invention includes the polymerization of epoxy resins, vinyl ethers and other cationically curable monomers.

20 Claims, No Drawings

CATIONICALLY CURABLE COMPOSITIONS CONTAINING TRIARYLCYCLOPROPENYLIUM SALTS

BACKGROUND OF THE INVENTION

The present invention relates to thermally and cationically curable compositions containing triarylcyclopropenylium salts. The present invention further relates to the use of triarylcyclopropenylium salts in combinations with coinitiators that interact with the cyclopropenylium cation to release protons, as thermal initiators in the polymerization of epoxy resins, vinyl ethers and other cationically curable compounds.

Triarylcyclopropenylium ions and salts are known from the literature for such wide and varied uses as sensitizers in electrophotographic systems to antibacterial and/or antiviral agents. Triarylcyclopropenylium compounds have often been synthesized, studied and reported in the literature.

Van Tamelen et al., "Photolysis of Triphenylcarbonium, Tropylium and Triphenylcyclopropenylium ions," J. of Am. Chem. Soc., Vol. 90, No. 5, (1968), Pp. 1372–1374, studied the effect of irradiating compounds with ultraviolet radiation, including triphenylcyclopropenylium ion in considering the formation of products from excited carbonium ions. van Tamelen et al. further disclose irradiation of a triphenylcyclopropenylium ion to form hexaphenylbenzene.

Broser et al., "Substituitierte Tri-Phenyl-Cyclopropenylium-Katlonen," Tetrahedron Letters, Vol. 7, p. 5331–5332 (1968), reported the production of triphenylcyclopropenylium salts where the phenyl radicals can be substituted by $CH_3$, Cl, Br, OH or $O—CH_2—C_6H_5$. Broser discloses the anions $ClO_4$ and Br. William Baker in Chemical Abstracts, Vol. 70, p. 262, No. 87088b, Chemical confirmation of the equivalence of carbon atoms of the three-membered ring of the triphenylcyclopropenylium cation, (1969) also reports on the production of the bromide salt of triphenylcyclopropenylium. Furthermore, D'yakonov in Chemical Abstracts, Vol. 72, p. 342, No. 110857, showed the equivalence of the carbon atoms of the three membered ring of the triphenylcyclopropenylium cation, in a paper that discloses the production of both the chloride and bromide salts of triphenylcyclopropenylium.

French Patent No. 2,013,105 made available to the public Mar. 27, 1970, discloses a photoconductor sensitized with a cyclopropenylium salt, specifically the triphenylcyclopropenylium salt. The patent discloses that aryl radicals can be substituted or unsubstituted by, for example, phenyl, chlorophenyl, or tolyl. The disclosed anions include perchlorate, fluoroborate, sulfonate, periodate, and halides such as chloride, bromide and iodate.

U.S. Pat. No. 3,728,388 discloses 1,2,3-trisubstituted cyclopropenylium salts having antibacterial and antiviral activity. More specifically, it describes a triphenylcyclopropenylium salt, the anion being any anion of a strong inorganic or organic acid, such as bromide, chloride, iodide, sulfate, tetrafluoroborate, perchlorate, p-toluenesulfonate, or methanesulfonate.

Frisch et al., "An Unusual Oxidative Addition-Ligant Ellimination Reaction. Preparation and Structure of $RhCl_2(Pme_2Ph)_2(C_2Ph_3)$," J. of Organometallic Chemistry, No. 142, Pp. C61–C64 (1977), discloses a triphenylcyclopropenylium cation $(C_3Ph_3^+)$ stabilized as the $Cl^-$ or $PF_a^-$ salt.

Komatsu et al., "Syntheses of Mono-, Bis-, and Tris (diisopropylamino)triphenylcyclopropenylium ions. Cyclopropenyl Analogues of Triphenylmethane Dyes," discloses an unsubstituted triphenylcyclopropenylium ion and triarylcyclopropenylium ions with dialkylamino substituents, (i.e. mono-, bis- and tris-(dilsopropylamino) triphenylcyclopropenylium ions, and mono- and bis-(dimethylamino) triphenylcyclopropenylium ions). Anions can be $ClO_4$ (perchlorate) or $BF_4$ (tetrafluoroborate). The disclosed use of these compounds is as dyes.

Gompper et al., "σ-(Dicarbonyl-cyclopentadienyl-eisen)-Derivate von Cyclopropenen und Cyclopropenyliumsalzen" discloses triphenylcyclopropenylium salt, the anion being $BF_4$ or Br. It also describes a diphenyl cyclopropenylium salt. The anion being $BF_4$, Br or $SbCl_6$.

Finally, U.S. Pat. No. 3,552,958 discloses sensitizers for organic photoconductors containing cyclopropenylium compositions. The objects are accomplished through the use of cyclopropenylium salts containing aryl and/or heterocyclic radicals. The anions are perchlorate, fluoroborate, sulfonate, periodate, and halides such as chloride, bromide and iodide.

SUMMARY OF THE INVENTION

A thermally curable composition comprising: (a) a compound of the Formula I:

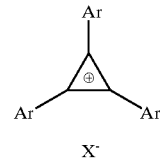

X⁻ where Ar is an aryl group which may be the same or different; and X is an anion selected from the group consisting of $Cl^-$, $F^-$, $Br^-$, $I^-$, $CF_3CO_2^-$, $CH_3CO_2^-$, $CF_3SO_3^-$, $ArSO_3^-$, $ClO_4^-$, $BF_4^-$, $PF_6^-$, $SbF_6^-$, $AsF_6^-$, $B(C_6F_5)^-$, and $B(Ar)_4^-$, (b) a cationically curable compound and
(c) a coinitiator that interacts with the compound of Formula I and releases a proton. The terms "cure" and "curable" as used herein refer to hardening by polymerization or cross-linking.

There is further disclosed a method comprising heating the composition described above to obtain a cured composition. Heating will typically be conducted at temperatures of about 30 to 60° C. for a time sufficient to cure the curable compound.

DETAILED DESCRIPTION

The present invention relates to the use of triarylcyclopropenylium compounds of the Formula I in the thermal initiation of cationic polymerization reactions.

In compounds of Formula I Ar may be mononuclear, polynuclear, or heterocylic. Ar may be selected from the group consisting of substituted or unsubstituted phenyl, substituted or unsubstituted naphthyl, substituted or unsubstituted tolyl and substituted or unsubstituted benzyl. In one embodiment, Ar may be selected from the group consisting of phenyl, chlorophenyl, tolyl, naphthyl and the like. Ar may be substituted from 0 to 5 times with one or more alkyl groups (typically having 1 to 10 carbon atoms) that may be same or different. Ar may contain one or more heteroatoms selected from, for example, nitrogen, oxygen or sulfur. Examples of compounds of Formula I include triphenylcyclopropenylium chloride, triphenylcyclopropenylium hexafluoroantimonate, triphenylcyclopropenylium tetrakis (pentafluorophenyl)borate, and triphenylcyclopropenylium hexafluorophosphate.

The synthesis of triarylcyclopropenylium halides is known in the art and is illustrated in Example 1. The triarylcyclopropenylium compounds may be made by reacting a triarylcyclopropenylium halide with a salt of the desired anion, e.g., $SbF_6^-$, $AsF_6^-$, and $B(C_6F_5)_4^-$.

The triarylcyclopropenylium compound is used with a coinitiator such as carbonyl compound or other Lewis base, such as an alcohol, that can release a proton in the thermal initiation of polymerization of one or more cationically curable compounds. The Lewis base may be in the form of the monomer or may be in the form of a solvent. It may be a carbonyl group containing compound with at least one hydrogen atom α to the carbonyl group. Alternatively it may be an alcohol, a thiol or an amine that contains an acidic hydrogen. It has been observed that the polymerization or cure rate of compositions of the invention increases with the ratio of the Lewis base, for example the carbonyl compound, to the triarylcyclopropenylium compound. Based upon this observation the following mechanism is postulated for proton generation when the Lewis base is the carbonyl group containing compound, cyclohexanone:

and other polymerizable or cross-linkable materials that are Lewis bases. A list of cationically curable compounds useful in the present invention can be found in U.S. Pat. 5,639,802 to Neckers et al and is incorporated herein by reference.

The epoxy resin polymerizable materials useful in the present invention may be virtually any of a variety of commercially available materials. These include the glycidyl ethers of bisphenol A. Such materials are widely available from a number of manufacturers such as Shell Chemical Company, DOW Chemical Company, and Ciba-Geigy Corporation in a variety of molecular weights and viscosities. Examples include: D.E.R. 332, D.E.R. 330, D.E.R. 331, D.E.R. 383, D.E.R. 661, TACTIX 123, TAXTIX 138, and TACTIX 177 (DOW trademarks); EPON 825, EPON 826, and EPON 828 (Shell trademarks); and, ARALDITE GY 6008, ARALDITE GY 6010, and ARALDITE GY2600 (Ciba-Geigy trademarks). Additionally, glycidyl ethers of fluorinated or brominated bisphenols, such as D.E.R. 542 and D.E.R. 566-A80 from DOW Chemical Company can be used.

Another class of polymerizable material is epoxy phenolic novolac and epoxy cresol novalac resins. These materials are

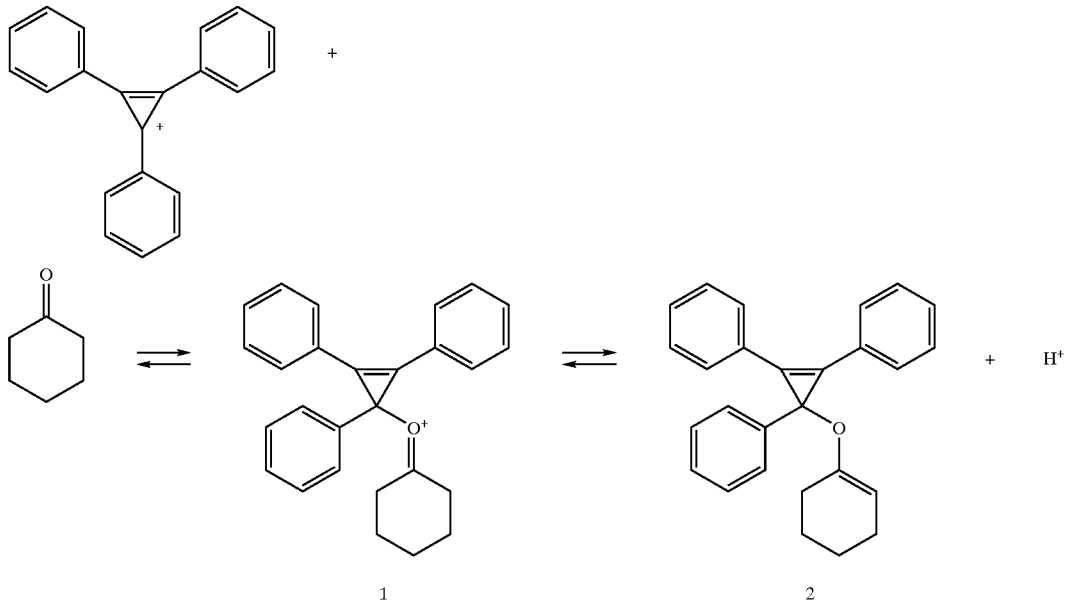

The coinitiator is believed to form a complex (such as 1) that is sufficiently acidic that it releases a proton. This mechanism is supported by the observation of compound 2 by other workers in subsequent experiments.

Thermally curable compositions in accordance with one embodiment of the invention may contain about 0.5 to 2 parts by weight triarylcyclopropenylium per 100 parts monomer and in some of the more typical embodiments may contain about 1 part per 100 parts of curable compound. The carbonyl compound should be present in at least an equimolar amount based on the initiator and is preferably present in a significant excess of at least twice and in most cases 2 to 90 times an equimolar amount of the initiator.

The initiator may be used to polymerize one or more monomers or a mixture of monomers and polymers. The polymerization reaction according to the present invention proceeds through thermal curing of the monomers. Monomers for use according to the present invention may be selected from any art recognized cationically curable materials and include epoxy resins, vinyl ethers, glycidyl ethers, also widely available from a number of manufacturers in a variety of molecular weights and viscosities. Examples include Epon 862, Epon 155, (Shell trademarks); D.E.R. 354, D.E.N. 431, D.E.N. 428, and D.E.N. 439 (DOW trademarks); and ARALDITE PY 306, ARALDITE EPN 1139, ARALDITE EPN 1138, ARALDITE GY 281, ARALDITE GY 285, ARALDITE GY 302-2, ARALDITE LY 9703, ARALDITE XD 4955, and ARALDITE ECN 9511 (Ciba-Geigy trademarks). A similar epoxy that may also be used is SU-8 (Shell trademark).

Several other polyfunctional glycidyl ethers are of significant importance for high performance applications i.e. heavy mechanical loads under conditions of high temperature and harsh environment. The materials include the tetraglycidyl ether of tetrakis (4-hydroxyphenyl) ethane, which is commercially available as EPON 1031 (Shell Chemical trademark) and ARALDITE MT 0163 (Ciba-Geigy trademark); the diglycidyl ether of 9,9-bis(4-hydroxyphenyl) fluorene is commercially available as EPON HPT 1079 (Shell Chemical TRADEMARK); glycidyl ethers of the condensation product of dicyclopentadiene and phenol are available such as TACTIX 556 (DOW Chemical trademark); the triglycidyl ether of tris (hydroxyphenyl) methane, which is available as TACTIX 742 (DOW Chemical trademark) or as XD9053.

EPON 1031, EPON HPT 1079, TACTIX 556, TACTIX 742 and XD9053, are either high viscosity liquids or solids at room temperature. Therefore it is advantageous to blend these materials with a low viscosity bisphenol A or bisphenol F based diglycidyl ether or reactive diluents. The resulting blends are less viscous at ambient temperatures and are more easily processed. Some heating may be required for adequate flow, but the temperatures needed are not high enough to cause thermal curing of the epoxy group. Specific blends were found to have a good overall combination of low viscosity in the uncured state and high glass transition temperature, flexural strength, and modulus when cured. It was found to be particularly advantageous to blend a high performance semi-solid epoxy such as TACTIX 556, TACTIX 742 or EPON HPT 1079, with a low viscosity bisphenol A or bisphenol F based glycidyl ether epoxy such as EPON 862, TACTIX 123, or a reactive diluent.

Cycloaliphatic epoxy compounds represent another group of polymerizable materials useful in the present invention. They are usually low viscosity liquids at room temperature and can either be used alone or as reactive diluents in blends with the semi-solid glycidyl ether epoxies. These materials include the carbonyl group containing 3',4'-epoxycyclohexylmethyl 3,4-epoxycyclohexanecarboxylate, which is available as ERL-4221 (Union Carbide Corporation trademark) and ARALDITE CY-179 (Ciba-Geigy trademark); diglycidylester of hexahydrophthalic anhydride which is available as CY 184 (Ciba-Geigy trademark); bis (3,4-epoxycyclohexylmethyl) adipate, which is available as ERL-4299 (Union Carbide trademark); the isomeric mixture of bis (2,3-epoxycyclopentyl) ether, which was once available as ERL-4205 (Union Carbide trademark); ERL-4205 reacted with ethylene glycol or blended with a bisphenol A based diglycidyl ether, which were once available from Union Carbide as ERLB-4617 and ERL-2258 (Union Carbide trademarks), respectively.

The epoxy resin monomer as just described may also be advantageously modified by mixing it with various additives. Such additives include polyols such as ethylene glycol, propylene glycol, 1,3-butylene glycol, 1,4-butylene glycol, and other glycols. Aromatic diphenols and polyphenolic compounds may also be used to modify the epoxy resin. Other reactive diluents, which contain vinyl, acrylate, or methacrylate may be employed to change reactivity, glass transition temperature, or mechanical properties in a manner known in the art. In addition, reactive diluents based on monofunctional or polyfunctional glycidyl ethers may also be used to reduce the viscosity or modify the resin systems. Additionally, nonreactive diluents, such as acetone, have been found to be useful for reducing the viscosity of the resin system which improves the processibility of the material before it is cured for certain applications, such as solvent based prepreg.

Preferred epoxy resins include cycloaliphatic epoxies such as Uvacure 1500; glycidyl ether epoxies such as Epon 815, a mixture of Epon 828 and n-butyl glycidyl ether.

Representative examples of vinyl ethers include polyethylene glycol divinyl ether and triethylene glycol trivinyl ether, and vinyl ether prepolymers such as vinyl ether epoxy resin.

In one embodiment, the polymerization reaction according to the present invention is carried out in the presence of a compound containing a carbonyl group, or other solvent capable of reacting with the compound of Formula I and releasing a proton. Certain monomers can provide the necessary carbonyl group (or Lewis base), while other processes will have to be carried out in the presence of a solvent containing a carbonyl group or that is a Lewis Base. Any art recognized solvent that is able to interact with the compound of Formula I as a Lewis base (e.g., an acid/base complex is formed in modest concentration by complexation with the cyclopropenylium cation such that the complex formed by neutralization is sufficiently acidic to release an equilibrium concentration of protons) should be useful herein.

It has been discovered that the presence of some solvents may improve the cure speed. Preferred solvents for use in some embodiments according to the present invention include, ketones, lactones and alcohols such as 4-hydroxyl-4-methyl-2-pentanone (hereinafter "DAA"), 1,5-dihydroxylnaphthalene (hereinafter "DHH"), butanol, cyclohexylmethanol, cyclohexanone, 2-pentanone, 3-pentanone, cyclopentanone, butanone, acetone, butyrolactone, propylene carbonate, and mixtures thereof. Other art recognized solvents will be readily apparent to the skilled artisan. Several of the diluents have been screened for activity. The relative activity of the screened solvents is cyclohexanone>2-pentanone>butanone>acetone. In one particular embodiment an epoxy resin is combined with a cyclopropenylium initiator and a ketone diluent.

The polymerization reaction according to one embodiment of the present invention can take from 2 seconds to 24 hours. Preferred cure times are 2 seconds to 1 hour. More preferred cure times are from 10 seconds to 30.

The following examples are illustrative of, but are not to be construed as limiting the invention embodied herein.

EXAMPLES

Example 1

Synthesis of Triphenylcyclopropenylium Hexafluoroantimonate (TCPF)

Triphenylcyclopropenylium hexafluoroantimonate was synthesized by the metatheses of triphenylcyclopropenylium chloride with sodium hexafluoroantimonate in acetonitrile. 0.003 moles of the triphenylcyclopropenylium chloride (literature) of Example 1 and 0.0031 moles of $SbF_6$ was each separately dissolved in 10 ml of $CH_3CN$ and then combined. NaCl was removed by filtration and washed with $CH_3CN$. To the filtrate was added ether. After filtration, a white, very light yellow solid was obtained. The melting point of this solid was between about 319 and 321° C.

Example 2

Synthesis of Triphenylcyclopropenylium Tetrakis (pentafluorophenyl) Borate (TCPB)

Triphenylcyclopropenylium tetrakis(pentafluorophenyl) borate was synthesized through the metathesis of triphenylcyclopropenylium chloride with sodium tetrakis (pentafluorophenyl) borate in acetonitrile. The compound was a sticky liquid and hard to solidify.

Example 3

Synthesis of Triphenylcyclopropenylium Hexafluorophosphate (TCPP)

Triphenylcyclopropenylium hexafluorophosphate was synthesized through the metathesis of triphenylcyclopropenylium chloride with sodium hexafluorophosphate in acetonitrile. The resulting white crystalline compound had a melting point of 310° C.

Example 4
Cure Testing of Epoxy Resin 828 (Bisphenol A Diglycidyl Ether) with TCPF

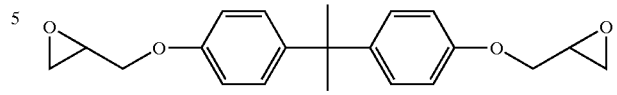

This is Epon 828. It was made by Shell. The company has now changed it's name to Resolution Performance Products. Samples of epoxy resin 828 were combined with 1% by weight of TCPF in the solvents set forth in Table 1 below. The amount of solvent, the color, the cure time and the results varied and are also set forth in Table 1, below.

TABLE 1

| Solvent | Solvent Amount % | Solubility | Color | Cure Time | Result | Polymer Quality |
|---|---|---|---|---|---|---|
| Dimethyl Sulfoxide | 5 | soluble | — | — | no cure | — |
| Dimethyl-formamide | 5 | soluble | — | — | no cure | — |
| Trimethyl-phosphate | 5 | partially soluble | yellow | 12–24 hrs | solid | fair |
| γ-Butyro-lactone | 5 | soluble | white | 10 hrs | solid | good |
| Dimethyl-sulfate | 7 | partially soluble | yellow | 12–24 hrs | solid | fair |
| Propylene Carbonate | 7 | soluble | white | 10 hrs | solid | good |
| Dioxane | 7 | partially soluble | yellow | 10 seconds | solid | fair |
| Tetrahydro-furan | 7 | partially soluble | yellow | 10 seconds | solid | fair |
| Cyclohex-anone | 7 | partially soluble | yellow | 5 seconds | solid | fair |
| Cyclopent-anone | 7 | partially soluble | yellow | 30 seconds | solid | fair |
| 2-Pentanone | 7 | partially soluble | yellow | 5 seconds | solid | fair |
| 3-Pentanone | 7 | partially soluble | yellow | 1 hour | solid | good |
| Diacetone-alcohol | 7 | partially soluble | yellow | 10 hrs | solid | good |

Example 5
Cure Testing of UCB 1500 with TCPF

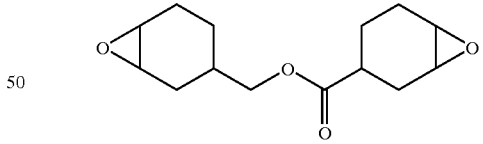

UCB 1500

Samples of epoxy resin 828 were combined with 1% by weight of TCPF in the solvents set forth in Table 2 below. The amount of solvent, the color, the cure time and the results varied and are also set forth in Table 2, below.

TABLE 2

| Solvent | Solvent Amount % | Solubility | Color | Cure Time | Result | Polymer Quality |
|---|---|---|---|---|---|---|
| Dimethyl Sulfoxide | 5 | soluble | — | — | no cure | — |
| Dimethyl- | 5 | soluble | — | — | no cure | — |

TABLE 2-continued

| Solvent | Solvent Amount % | Solubility | Color | Cure Time | Result | Polymer Quality |
|---|---|---|---|---|---|---|
| formamide | | | | | | |
| Trimethyl-phosphate | 5 | partially soluble | white | 4 hrs | solid | good |
| γ-Butyro-lactone | 5 | soluble | white | 30 min | solid | good |
| Dimethyl-sulfate | 7 | partially soluble | white | 2 hrs | solid | good |
| Propylene Carbonate | 7 | soluble | white | 1 hr | solid | good |
| Dioxane | 7 | partially soluble | white | 10 hrs | solid | good |
| Tetrahydro-furan | 7 | partially soluble | yellow | 10 seconds | solid | fair |
| Cyclohex-anone | 7 | partially soluble | yellow | 5 seconds | solid | fair |
| Cyclopent-anone | 7 | partially soluble | yellow | 3 minutes | solid | fair |
| 2-Pentanone | 7 | partially soluble | yellow | 10 minutes | solid | fair |
| 3-Pentanone | 7 | partially soluble | yellow | 1 hour | solid | good |
| Diacetone-alcohol | 7 | partially soluble | yellow | 1 hour | solid | good |

Example 6

Cure Testing of Epoxy Resin 828 with TCPB

Samples of epoxy resin 828 were combined with 0.5% by weight of TCPB in the solvents set forth in Table 3 below. The amount of solvent, the color, the cure time and the results varied and are also set forth in Table 3, below.

TABLE 3

| Solvent | Solvent Amount % | Color | Cure Time | Result | Polymer Quality |
|---|---|---|---|---|---|
| Trimethyl-phosphate | 5 | yellow | 12–24 hrs | soft solid | poor |
| Dioxane | 5 | yellow | 12–24 hrs | soft solid | poor |
| Methyl Benzoate | 5 | yellow | 12–24 hrs | soft solid | poor |

Example 7

Cure Testing of UCB 1500 with TCPB

Samples of UCB 1500 were combined with 0.5% by weight of TCPB in the solvents set forth in Table 4 below. The amount of solvent, the color, the cure time and the results varied and are also set forth in Table 4, below.

TABLE 4

| Solvent | Solvent Amount % | Color | Cure Time | Result | Polymer Quality |
|---|---|---|---|---|---|
| Trimethyl-phosphate | 5 | yellow | 30 minutes | solid | good |
| Dioxane | 5 | dark | 10 seconds | solid | fair |
| Methyl Benzoate | 5 | yellow | 30 minutes | solid | good |

Example 8

Cure Testing of UCB 1500 as Films using TCPF and TCPB

UCB 1500 was combined with 1% of an initiator selected from TCPF or TCPB, using—butyrolactone as the solvent (5%) in all cases. The formulations were then tested as 1 mil and 5 mil thick films as well as in the vial (bulk).

TABLE 5

| Initiator | Cure time | Thickness | Results |
|---|---|---|---|
| TCPF | 20 min | 1 mil | Tack - free through cured in 20 mins |
| TCPF | 1–1.5 hrs | 5 mil | Tack free in 20 minutes Full cure in more than 1 hour |
| TCPF | <20 min | bulk | Polymerized in 20 minutes Charring occurred due to exotherm |
| TCPB | 20 min | 1 mil | Tack free - through cured in 20 mins |
| TCPB | 1–1.5 hrs | 5 mil | Tack free in 20 minutes Full cure in more than 1 hour |
| TCPB | 3–4 hrs | bulk | Gelled after 1.5 hours Cured to hard polymer in 34 hours |

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A thermally curable composition comprising:
(a) compound of the Formula I:

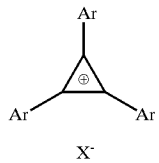

X⁻ wherein AR represent aryl groups which may be the same of different, and X is an anion selected from the group consisting of Cl⁻, F⁻, Br⁻, I⁻, $CF_3CO_2^-$, $CH_3CO_2^-$, $CF_3SO_3^-$, $ArSO_3^-$, $ClO_4^-$, $BF_4^-$, $PF_6^-$, $SbF_6^-$, $AsF_6^-$, $B(C_6F_5)^-$, and $B(Ar)_4^-$,
(b) a cationically curable compound, and
(c) a coinitiator capable of interacting with the compound of Formula I and releasing a proton.

2. The composition of claim 1 wherein the coinitiator is a Lewis base and is a cationically curable material or a solvent that is able to react with the compound of Formula (I) and release proton.

3. The composition of claim 2 wherein the coinitiator is a solvent selected from the group consisting of a ketone, a lactone, an alcohol, a thiol, or an amine.

4. The composition of claim 3 wherein the solvent is selected from the group consisting of 4-hydroxyl-4-methyl-2-pentanone, 1,5-dihydroxylnaphthalene, butanol, cyclohexylmethanol, cyclohexanone, 2-pentanone, 2-pentanone, cyclopentanone, butanone, acetone, butyrolactone, propylene carbonate, and mixtures thereof.

5. The composition of claim 3 wherein the cationically curable compound is an epoxy compound, an epoxy resin, a vinyl ether, or a glycidyl ether.

6. The composition of claim 5 wherein the coinitiator is present in an amount that is equal to or greater than the amount of the compound of Formula I on a molar basis.

7. The composition of claim 6 wherein Ar is selected from the group consisting of alkylated aromatics, and halogenated aromatics.

8. The composition of claim 6 wherein Ar is a phenyl group.

9. The composition of claim 8 wherein the coinitiator is present in an amount that is at least twice the amount of the compound of Formula I on a molar basis.

10. The composition of claim 1 wherein the coinitiator is a carbonyl compound selected from the group consisting of cyclohexanone and cyclopentanone.

11. A method of polymerizing a monomer comprising: reacting a cationically curable compound with a compound of the Formula I:

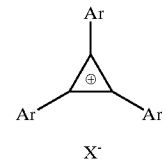

X⁻ wherein Ar is an aryl group; and X is an anion selected from the group consisting of Cl⁻, F⁻, Br⁻, I⁻, $CF_3CO_2^-$, $CH_3CO_2^-$, $CF_3SO_3^-$, $ArSO_3^-$, $ClO_4^-$, $BF_4^-$, $PF_6^-$, $SbF_6^-$, $AsF_6^-$, $B(C_6F_5)^-$, and $B(Ar)_4^-$, in the presence of a coinitiator that is capable of interacting with the compound of Formula I and releasing a proton, at an elevated temperature for a time sufficient to effect polymerization of said cationically curable compound.

12. The method of claim 11 wherein the coinitiator is a Lewis base and a cationically curable material or a solvent that is able to react with the compound of Formula I and release a proton.

13. The composition of claim 12 wherein the coinitiator is solvent selected from the group consisting of a ketone, a lactone or an alcohol.

14. The method of claim 13 wherein the solvent is a carbonyl compound is selected from the group consisting of 4-hydroxyl-4-methyl-2-pentanone, 1,5-dihydroxylnaphthalene, butanol, cyclohexylmethanol, cyclohexanone, 2-pentanone, 2-pentanone, cyclopentanone, butanone, acetone, butyrolactone, propylene carbonate, and mixtures thereof.

15. The method of claim 12 wherein the cationically curable compound is an epoxy compound, an epoxy resin, a vinyl ether, or a glycidyl ether.

16. The method of claim 15 wherein the coinitiator is present in an amount that is equal to or greater than the amount of the compound of Formula I on a molar basis.

17. The method of claim 15 wherein Ar is selected from the group consisting of alkylated aromatics, and halogenated aromatics.

18. The method of claim 15 wherein Ar is a phenyl group.

19. The method of claim 18 wherein the coinitiator is present in an amount that is at least twice the amount of the compound of Formula I on a molar basis.

20. The method of claim 11 wherein the coinitiator is a carbonyl group containing compound selected from the group consisting of cyclohexanone and cyclopentanone.

* * * * *

UNITED STATES PATENT AND TRADEMARK OFFICE
CERTIFICATE OF CORRECTION

PATENT NO. : 6,420,460 B1
DATED : July 16, 2002
INVENTOR(S) : Wenqin Zhang et al.

It is certified that error appears in the above-identified patent and that said Letters Patent is hereby corrected as shown below:

<u>Column 11,</u>
Line 31, change "2-pentanone" to -- 3-pentanone --.

<u>Column 12,</u>
Line 30, change "2-pentanone" (2nd occurrence) to -- 3-pentanone --.

Signed and Sealed this

Twenty-fourth Day of December, 2002

JAMES E. ROGAN
*Director of the United States Patent and Trademark Office*